United States Patent
Doshi et al.

(10) Patent No.: US 9,098,822 B1
(45) Date of Patent: Aug. 4, 2015

(54) OPTIMIZATION OF PACKAGING SIZES

(75) Inventors: Hardik B. Doshi, Seattle, WA (US); Sebastian Lehmann, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 740 days.

(21) Appl. No.: 13/281,497

(22) Filed: Oct. 26, 2011

(51) Int. Cl.
*G06Q 10/08* (2012.01)
*G06F 17/50* (2006.01)

(52) U.S. Cl.
CPC .......... *G06Q 10/08345* (2013.01); *G06F 17/50* (2013.01)

(58) Field of Classification Search
CPC .. G06Q 10/04; G06Q 10/08345; G06Q 17/50
USPC .............. 700/97, 216; 705/35, 335, 400; 707/104.1; 53/492
See application file for complete search history.

(56) References Cited

U.S. PATENT DOCUMENTS

| | | | | |
|---|---|---|---|---|
| 5,600,565 A | * | 2/1997 | Wagner et al. | 700/219 |
| 6,721,762 B1 | * | 4/2004 | Levine et al. | 1/1 |
| 7,366,643 B2 | * | 4/2008 | Verdura et al. | 703/1 |
| 2003/0200111 A1 | * | 10/2003 | Damji | 705/1 |
| 2013/0179361 A1 | * | 7/2013 | Williams et al. | 705/330 |

OTHER PUBLICATIONS

Roembke, Jackie, "From the Last Step Forward", Nov. 1, 2007, Wood Digest, highbeam.com, 6 pages.*

* cited by examiner

*Primary Examiner* — Shannon S. Campbell
*Assistant Examiner* — Freda A Nelson
(74) *Attorney, Agent, or Firm* — Thomas | Horstemeyer, LLP

(57) ABSTRACT

Various embodiments are provided for determining optimum sizes of packaging in a packaging suite employed in a materials handling facility. The packaging may be used, for example, in the shipping of items from the materials handling facility to various destinations. The sizes of the packaging in the packaging suite are determined based at least upon a cost associated with the packaging, packaging materials and shipping costs of the packaging when applied to a shipment history of the materials handling facility.

20 Claims, 6 Drawing Sheets

OPTIMIZATION OF PACKAGING SIZES

BACKGROUND

In materials handling facilities, it is often the case that products are shipped to various destinations using various packaging. In order to ship products to their various destinations, a materials handling facility may stock various types of packaging in which products are placed before shipment. The packaging serves to protect the products during shipment. Voids in the packaging, or unfilled space, can be filled with a fill material, such as one or more air pillows. Accordingly, the packaging employed to package a shipment can be associated with material costs in the form of the cardboard or other material needed for constructing the packaging and protecting items in the shipment. Additionally, shipping and/or transportation costs incurred in the delivery of shipments to their destinations are also incurred and can vary based upon the weight and/or dimensions of packaging material (e.g., boxes).

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
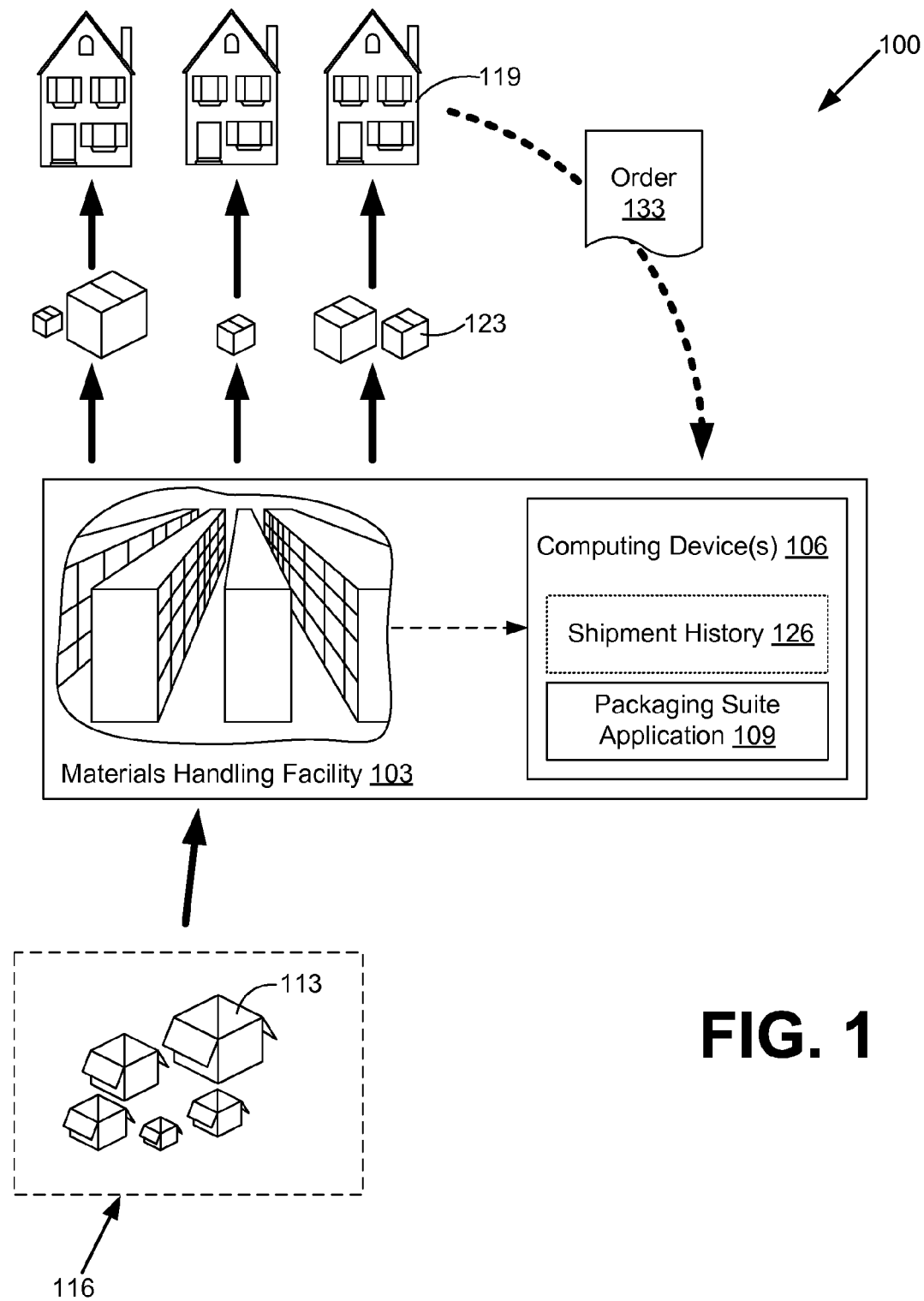
FIG. 1 is a drawing of a materials handling environment according to an embodiment of the present disclosure.

With reference to FIG. 1, shown is a materials handling environment 100 that illustrates a flow of information and physical items in a manner that facilitates an optimization of packaging employed by a materials handling facility 103 according to an embodiment of the present invention. The materials handling environment 100 includes at least one materials handling facility 103. The materials handling facility 103 may comprise, for example, an order fulfillment center, distribution center, warehouse, cross-docking facilities, packaging facility, shipping facility, or other facilities, or combinations of such facilities for performing one or more functions of material or inventory handling.

The operation of the materials handling facility 103 is orchestrated by various materials handling facility management systems that can be implemented in at least one computing device 106. Such systems may include, for example, an order processing system, inventory control systems, security systems, routing systems, and many other systems. The computing device 106 may comprise, for example, a server computer or any other system providing computing capability. Alternatively, a plurality of computing devices 106 may be employed that are arranged, for example, in one or more server banks or computer banks or other arrangements. For example, a plurality of computing devices 106 together may comprise a cloud computing resource, a grid computing resource, and/or any other distributed computing arrangement. Such computing devices 106 may be located in a single installation or may be distributed among many different geographical locations. For purposes of convenience, the computing device 106 is referred to herein in the singular. Even though the computing device 106 is referred to in the singular, it is understood that a plurality of computing devices 106 may be employed in the various arrangements as described above.

Among the applications executed by the at least one computing device 106 associated with the materials handling facility 103 is a packaging suite application 109. The packaging suite application 109 is executed to identify optimum sizes of packaging 113 in a packaging suite 116 that is used by the materials handling facility 103 to package items for shipment to respective shipping destinations 119. In this respect, the materials handling facility 103 packages items in the packaging 113 and ships the items in the resulting shipments 123 to the ultimate shipping destinations 119. The packaging 113 can comprise a three-dimensional bounding box comprising cardboard, a corrugate material, or any other material from which a box can be formed. The packaging 113 can also comprise envelopes, tube mailers, or other types of packaging. In the context of this disclosure, a three-dimensional bounding box need not be a cube and/or cuboid. For example, a three-dimensional bounding box can take various other shapes, such as triangular, tubular, or any other shapes that can form a three-dimensional bounding box or other packaging 113. The packaging 113 can also comprise other materials that are used to package items for shipment. For example, the items associated with a shipment 123 may not occupy all of the volume of packaging 113 that is selected for the shipment 123. Consequently, fill material such as loose-fill material (foam packing peanuts and/or other cushioning material), air filled packing pillows, shredded paper, recycled fill material or other materials can be inserted into the shipment 123 to prevent shifting and/or damage to the items within the packaging 113.

The shipping destinations 119 may comprise, for example, residential locations, commercial locations, governmental locations, internal locations within a given materials handling facility 103 or other facility, or other destinations. In one embodiment, the items that are packaged using the packaging 113 and shipped to the destinations 119 as shipments 123 can be associated with orders from customers in an electronic commerce system. In this scenario, the computing device 106 can, in response to an order processed by an electronic commerce system, initiate fulfillment of the order by instructing personnel or machinery in one or more materials handling facility 103 to pick items associated with the order, select packaging 113 and cause the assembled shipment to be sent to its destination.

In one embodiment, the items packaged using the packaging 113 can have known dimensions or shipping volumes. Accordingly, the materials handling facility management systems orchestrating shipment of items from the materials handling facility 103 can select the appropriately sized packaging 113 in which one or more of the items associated with an order can be packaged and shipped. Additionally, because the item dimensions can be known, the materials handling facility management systems can also specify how much fill material should be inserted in the packing 113 along with the items of a shipment 123.

The packaging 113 used to package the items that are shipped to respective shipping destinations 119 may comprise any one of a number of different types of packaging. For example, the packaging may comprise, for example, boxes, crates, cases, envelopes, encasements, bundles, packets, cartons, bins, receptacles, containers, capsules, and other types of packaging. The packaging 113 may come in many different sizes and shapes. Also, the packaging may be constructed of many different materials including, for example, paper, plastic, cardboard (which is typically constructed from paper), rubber, metal, or other materials. In addition, for purposes of the present discussion, the term "shipment" refers to items that are grouped for shipment from a given materials handling facility 103. It may be the case that a given shipment will be shipped in multiple shipments 123. It is also possible that a given shipment may be sent in a single shipment 123.

In the case that the materials handling environment 100 facilitates order fulfillment, individuals at the respective shipping destinations 119 may generate orders 133 for goods or items. The orders 133 may be transmitted to an order processing system associated with the materials handling facility 103, for example, over the Internet or other transmission medium. Ultimately, the ordered items are obtained from various bins or other structures within the materials handling facility 103 and are packaged for shipment to their respective shipping destination 119 in the form of one or more shipments 123.

In order to determine, from a cost point of view, an optimal packaging suite 116 that is employed by the materials handling facility 103 to package items for shipping, the packaging suite application 109 performs various calculations based upon a shipment history 126 that can be stored in a data store accessible to the computing device 106. A packaging suite 116 specifies a predefined number of different sizes of packaging 113 that can be stocked by the materials handling facility 103 in which items can be packaged and shipped to their final destinations. The materials handling facility management system orchestrating the materials handling facility 103 can identify one or more packaging 113 selections from the packaging suite 116 in which items can be loaded based at least upon the dimensions of the item. In some embodiments, a shipment 123 can be split across more than one packaging 113 selection if it can be determined that a lower cost in terms of the cost of the packaging materials and shipping costs would be achieved. According to one embodiment, the packaging suite application 109 and the shipment history 126 may be stored and/or executed within a suitable computing system as will be described.

The packaging suite application 109 is executed in order to optimize the sizes of the packaging 113 used by the materials handling facility 103 so as to minimize material costs (the cost of the packaging and/or fill material used for a shipment) as well as shipping costs (the costs incurred in transporting the shipment to its destination). The packaging suite application 109 can generate a packaging suite 116, which can comprise a plurality of dimensions associated with x, y, and z dimensions of three-dimensional bounding boxes in the packaging suite. As noted above, as packaging 113 need not be a cube and/or cuboid, the dimensions associated with one of the packaging suite 116 can also comprise a radius, circumference, height, triangular dimensions, or any other permutation of dimensions for which an interior volume and/or shipping cost of a corresponding three-dimensional bounding box can be calculated. The packaging suite application 109 can then analyze the shipment history 126 and identify the items that were shipped to their various final destinations as well as the packaging 113 from the packaging suite 116 in which the items can be shipped to a final destination. In this way, the packaging suite application 109 can determine a cost associated with shipping each shipment in a packaging suite 116 by identifying the packaging 113, packaging materials as well as shipping cost associated with shipment of the items from the shipment history.

Accordingly, the packaging suite application 109 can also determine whether an alternative packaging suite 116 including a different mix of sizes of packaging 113 would have resulted in a lower overall cost in terms of the cost of the packaging 113, packaging materials and shipping costs.

In other words, the packaging suite application 109 can apply a cost function to a shipment history over a historical period of time (e.g., a one year period of time) and determine a cost of servicing the shipment history using the packaging suite. The packaging suite application 109 can employ the cost function to calculate the cost in terms of the cost of the packaging 113, packaging materials and shipping costs that may be charged by a carrier to deliver the shipment to a final destination for each shipment in the shipment history. The cost of the packaging 113 can be determined for each shipment of items from the materials handling facility 103 by calculating, for a three-dimensional bounding box selected for the shipment, a cost of the cardboard, paper, corrugate material and/or any other materials needed to construct a three-dimensional bounding box having the dimensions of the chosen box. For example, the packaging suite application 109 can be configured with a cost per square inch of cardboard material and calculate an amount of cardboard needed to construct and/or purchase a box of the given dimension.

Additionally, the packaging suite application 109 can determine the volume of the selected box that the item(s) shipped therein consume and calculate a volume of the void and/or empty space. The packaging suite application 109 can then calculate an amount of fill material needed to consume the volume of the empty space and associate a cost with this fill material. For example, the packaging suite application 109 can be configured with a fill material cost factor that prices the fill material by volume. Then, the packaging suite application 109 can determine a shipping cost associated with shipping the box to its final destination. In some embodiments, the packaging suite application 109 can be configured with shipping rates from which a shipping cost can be calculated based at least upon the weight and/or volume of the box. In some embodiments, the packaging suite application 109 can be configured with a first shipping rate for boxes having a volume and/or weight within a certain range and a second shipping rate for boxes having a volume and/or weight within another range. For example, shipping carriers may charge a first rate for boxes having a volume up to a threshold and charge a second rate for oversized boxes. In other embodiments, shipping carriers may charge the greater of a weight-based shipping rate and a volume-based shipping rate. Accordingly, the packaging suite application 109 can sum the cost calculated using the cost function for each shipment in the shipment history to determine what the packaging suite 116 would cost to service the shipment history.

The packaging suite application 109 can then determine whether an alternative packaging suite 116 that comprises packaging 113 of different dimensions relative to the initial packaging suite 116 would have yielded a lower cost to package and ship the items in the shipment history. In one embodiment, the packaging suite application 109 can adjust at least one dimension associated with at least one of the three-dimensional bounding boxes of an initial packaging suite 116 and calculate a total cost associated with the adjusted packaging suite by applying the cost function to the shipping history. In other words, the packaging suite application 109 can determine what it would have cost to employ this hypothetical packaging suite to service a shipment history in terms of the materials required to construct and/or purchase the three-dimensional bounding boxes comprising the adjusted packaging suite, the other packing materials, and associated shipping costs.

The packaging suite application 109 can also be configured to periodically execute and determine whether an alternative packaging suite 116 other than one employed in a materials handling facility 103 would yield a lower cost to service a shipment history 126 over a historical period of time. Accordingly, the packaging suite application 109 can generate alerts and/or recommendations that the current packaging suite 116 used in a materials handling facility 103 may not comprise the lowest cost packaging suite 116. For example, the packaging suite application 109 can generate an alert and/or recommendation to modify the current packaging suite 116 if an adjusted packaging suite 116 associated with a lower cost can be identified and that is a lower cost than that of the current packaging suite 116 by a predetermined threshold. Such a threshold can comprise a percentage of a total cost of the current packaging suite 116 and/or a fixed amount.

In one embodiment, the packaging suite application 109 can employ a plurality of non-negative, non-zero numbers to represent each of three dimensions associated with a three-dimensional bounding box. These three numbers can represent dimensions of the box in the x, y, and z axes in any unit of measure (e.g., centimeters, inches, etc.). Accordingly, to generate an adjusted packaging suite for which a cost function can be applied to the shipment history, the packaging suite application 109 can adjust at least one dimension of at least one box in an initial packaging suite by a minimum adjustment amount. Upon generating an adjusted packaging suite, the packaging suite application 109 can apply the cost function to the adjusted packaging suite and the shipment history to determine a cost of employing the adjusted packaging suite in the materials handling facility 103. Additionally, the packaging suite application 109 can modify at least one random dimension of a random number of boxes in an initial packaging suite by a random amount to generate an adjusted packaging suite on which the cost function can be applied.

In some embodiments, the packaging suite application 109 can generate a plurality of adjusted packaging suites and calculate a cost of each adjusted packaging suite as applied to the shipment history. In other words, the packaging suite application 109 can iterate through a plurality of possible packaging suites that include hypothetical three-dimensional bounding boxes of varying sizes and determine a cost of each packaging suite. The packaging suite application 109 can determine a packaging suite that would have yielded the lowest cost of packaging materials, application of the packaging as well as shipment costs to the materials handling facility 103. For each adjusted packaging suite for which the cost function is applied to the shipment history, the packaging suite application 109 can also identify a number of each box size in the adjusted packaging suite that are used to service the shipment history, which can inform decisions regarding how many of each box in an adjusted packaging suite might be required if the suite is employed in the materials handling facility 103.

To perform a cost analysis as described above, the packaging suite application 109 can be seeded with an initial packaging suite in various ways. In one example, the packaging suite application 109 can be provided with an input (e.g., by a user) that specifies a fixed number of three-dimensional bounding boxes that should comprise a packaging suite 116, and the packaging suite application 109 can randomly generate a set of dimensions corresponding to a number of boxes corresponding to the fixed number. As another example, the packaging suite application 109 can generate an initial packaging suite 116 based upon the fixed number by identifying a subset of item types that are most frequently shipped from the materials handling facility 103. The packaging suite application 109 can designate dimensions of the boxes comprising an initial packaging suite 116 that correspond to the dimensions of the subset of item types. For example, the packaging suite application 109 can identify that the most commonly shipped item from the materials handling facility 103 is a compact disc. Accordingly, it can designate dimensions of the boxes that correspond to a box in which a compact disc can be shipped. In another embodiment, the dimensions corresponding to the initial packaging suite 116 can correspond to one that has been most recently employed in the materials handling facility 103. In yet another embodiment, the dimensions corresponding to the initial packaging suite 116 can be user specified.

The packaging suite application 109 can then apply the cost function to the randomly generated initial packaging suite 116 and a shipment history for a historical time period to determine a cost of the suite. Thereafter, the packaging suite application 109 can generate an adjusted packaging suite by adjusting at least one of the dimensions by a minimum adjustment threshold amount and initiate a new analysis that applies the cost function to the adjusted packaging suite. The packaging suite application 109 can repeat the process and generate a new adjusted packaging suite by modifying at least one dimension of the adjusted packaging suite and/or initial packaging suite 116. The packaging suite application 109 can continue generating adjusted packaging suites and calculating a cost of the various adjusted packaging suites for a predetermined amount of time and/or until a predetermined number of permutations of dimensions has been analyzed. The minimum adjustment threshold by which at least one of the dimensions is modified can be tuned to ensure sufficient diversity in the adjusted packaging suites that are generated by the packaging suite application 109. Similarly, the packaging suite application 109 can also be configured with a minimum number of dimensions to be adjusted when generating an adjusted packaging suite.

Figure 2:
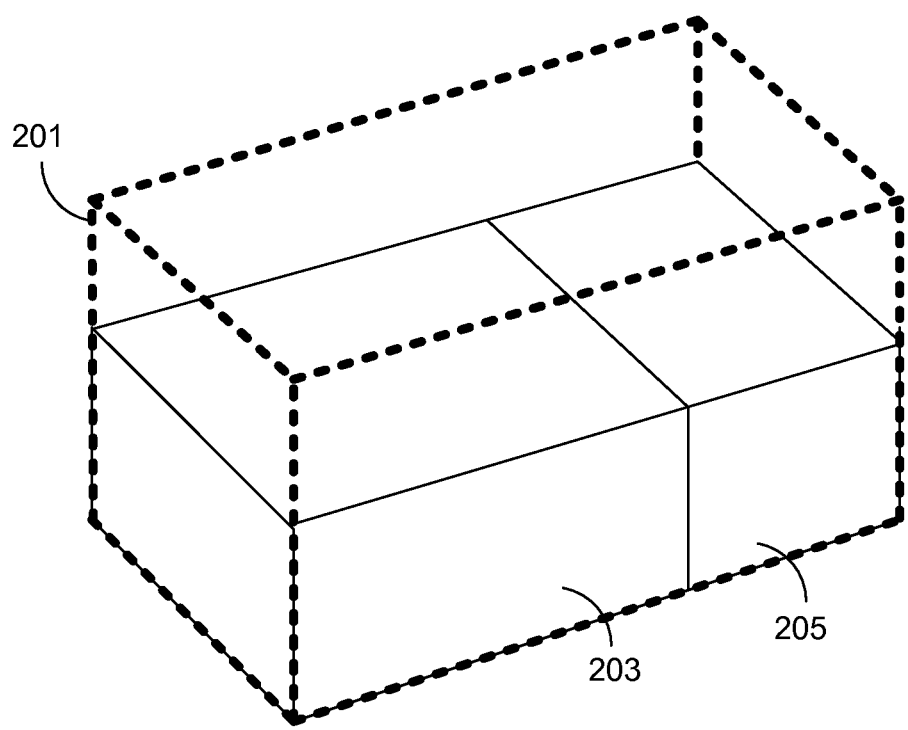
FIGS. 2-3 are drawings of example boxes that can be associated with a packaging suite and analyzed by the computing device of FIG. 1 according to various embodiments of the present disclosure.
Figure 3:
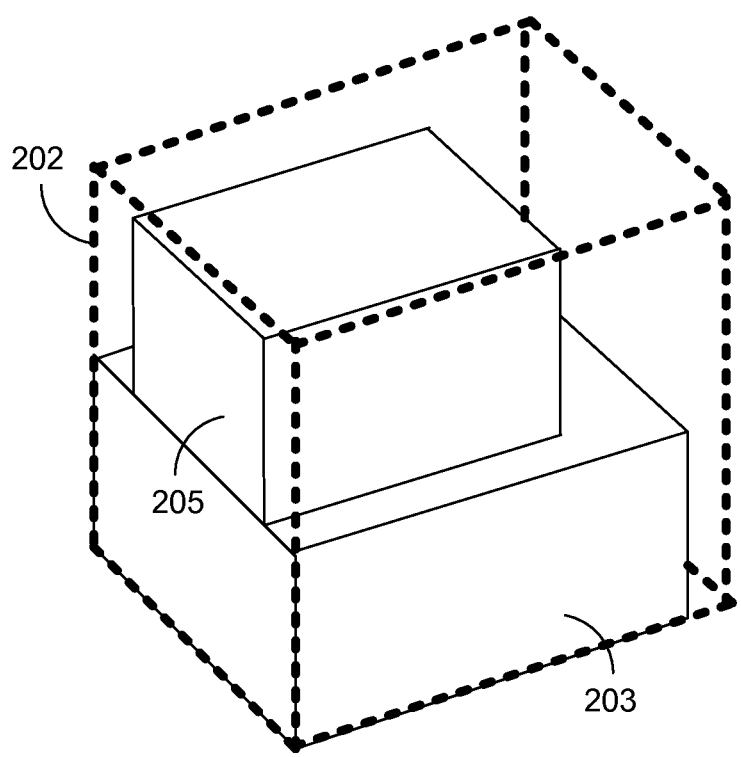

Reference is now made to FIGS. 2-3, which illustrate examples of a how the packaging suite application 109 may analyze packaging suites 116 that may include three-dimensional bounding boxes of varying dimensions. FIGS. 2-3 also illustrate how the packaging suite application 109 can calculate a cost associated with a particular shipment that may vary depending on the dimensions of the boxes comprising packaging suites. In FIG. 2, a first three-dimensional bounding box 201 is illustrated. When analyzing a given shipment history to calculate a cost of the packaging suite 116 corresponding to a shipment history, the packaging suite application 109 can identify a box from the packaging suite 116 most appropriate for the items in a shipment from the shipment history. In other words, the packaging suite application 109 can select the smallest possible box from the packaging suite 116 in which the items from a shipment can fit.

The depicted box 201 can be one of a fixed number of boxes associated with a packaging suite 116. The depicted box is associated with certain dimensions x, y, and z. The packaging suite application 109 can determine a cost of the box 201 itself by calculating an amount of material needed to construct the box. Such a calculation can take into account the fact that a box that may be constructed out of cardboard, for example, is constructed with flaps on at least one side allowing for collapsibility as well as opening and closing of the box 201. Accordingly, two hypothetical boxes may have the same volume but differing x, y, and z dimensions, resulting in differing costs due to the amount of material needed.

The packaging suite application 109 can also determine the volume of the box 201 that is not consumed with the items 203, 205. As noted above, the packaging suite application 109 can determine a cost of packaging material such as fill materials that may be placed in this space when the box is shipped to its final destination. The packaging suite application 109 can then calculate a shipping cost associated with delivering the box 201 to its final destination to determine an overall cost associated with the shipment using a box from the packaging suite 116. The packaging suite application 109 can perform such an analysis on all of or a sampling of shipments from a shipment history to determine an overall cost associated with servicing the shipments from the shipment history by the materials handling facility using the packaging suite 116.

Reference is now made to FIG. 3, which illustrates an example of a three-dimensional bounding box 202 in which the items 203, 205 can be packaged and shipped. In this example, the box 202 can comprise dimensions that differ from the box 201 shown in FIG. 2. However, the items 203, 205 may be packaged in the box 202 and result in a lower cost relative to the box 201 due to various factors. As noted above, the box 202 may be able to be constructed using less material and correspondingly may cost less. Additionally, less fill material may be required to fill any empty space in the box 202 once the items 203, 205 are packaged in the box 202.

Figure 4:
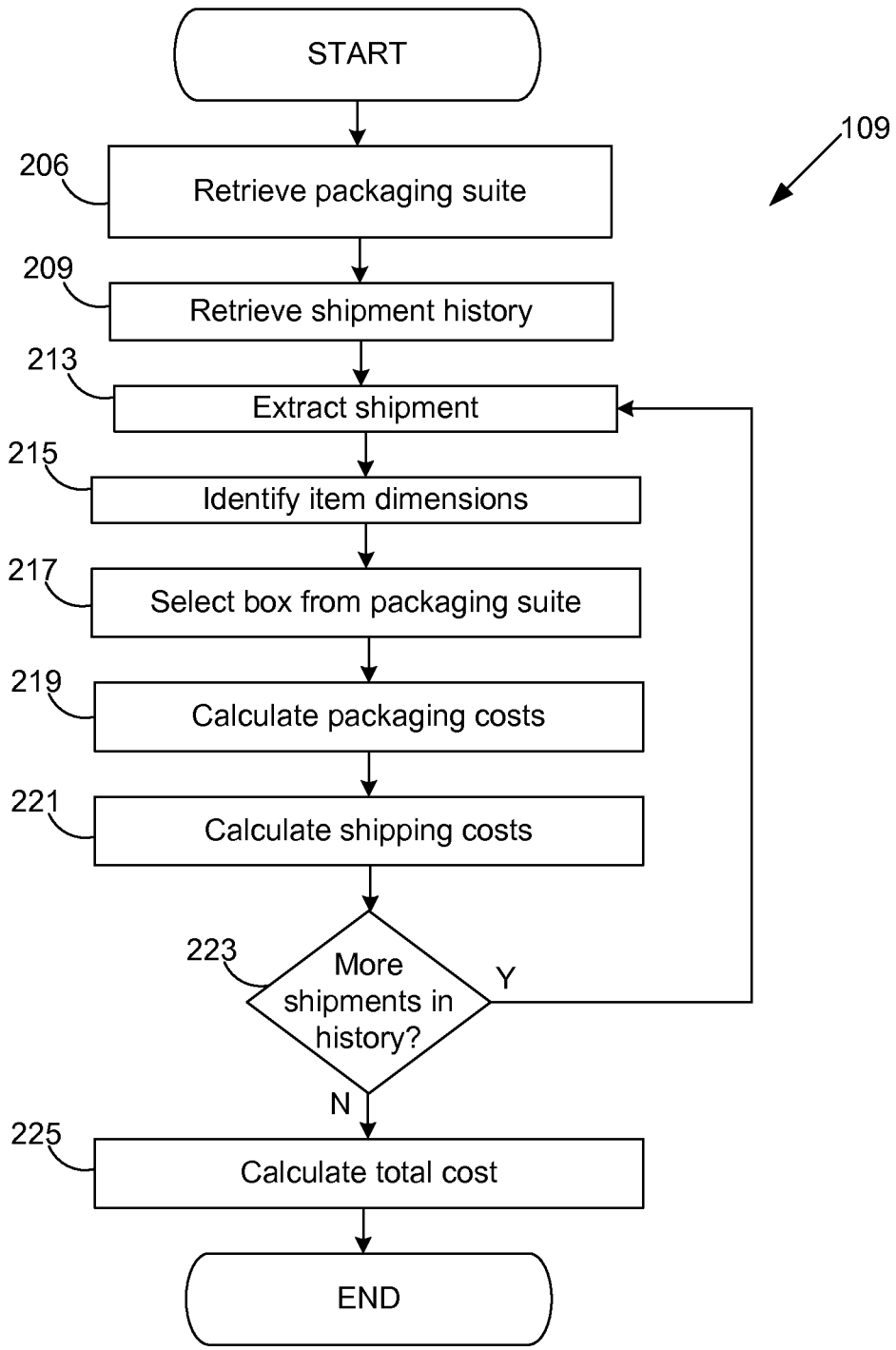
FIG. 4 is a flowchart that provides one example of a packaging suite application that is executed in the computing device of FIG. 1 according to various embodiments of the present disclosure.
Figure 5:
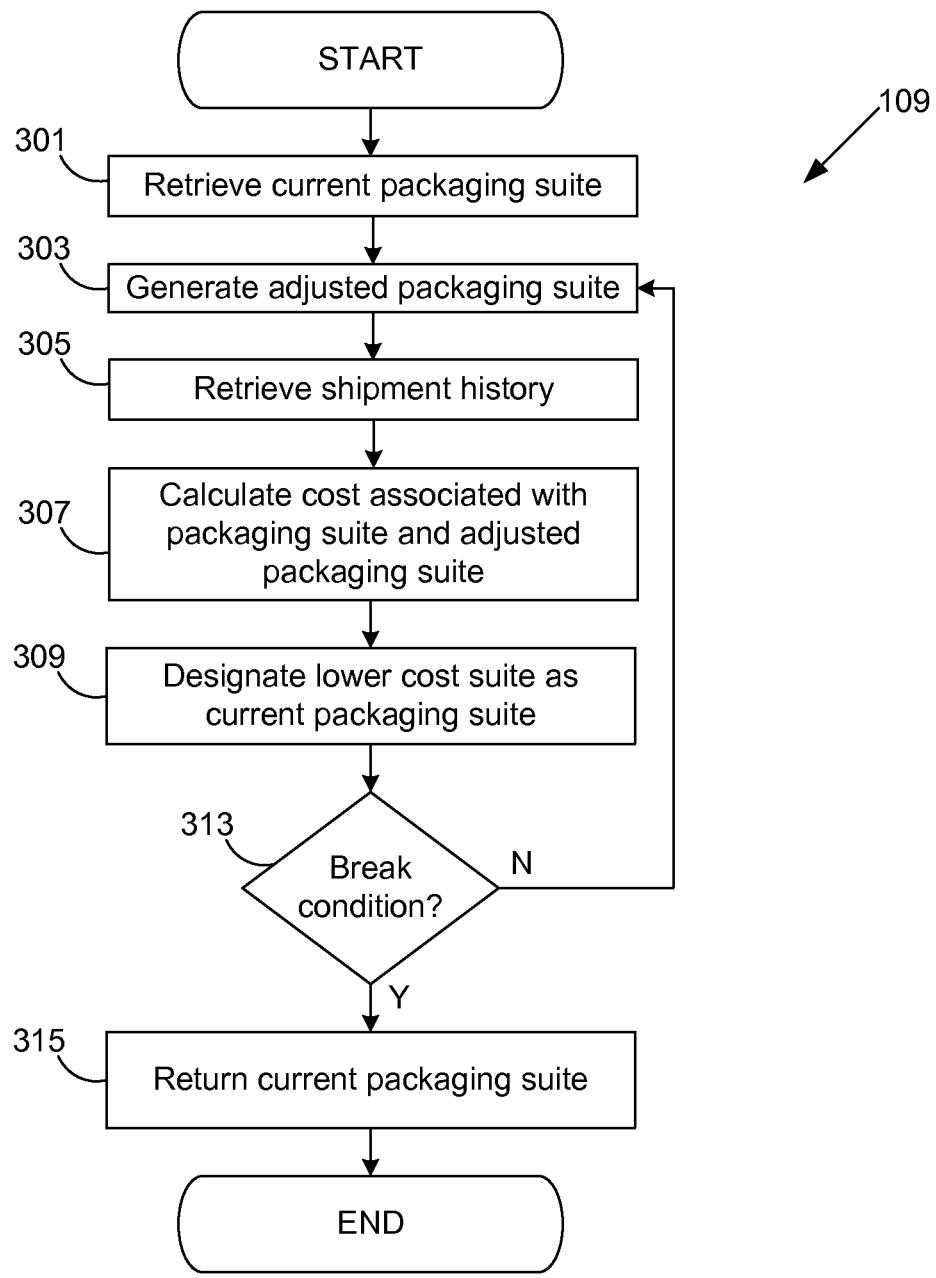
FIG. 5 is a flowchart that provides one example of a packaging suite application that is executed in the computing device of FIG. 1 according to various embodiments of the present disclosure.

Referring next to FIGS. 4-5, shown are flowcharts that provide examples of the operation of a portion of the packaging suite application 109 according to various embodiments. It is understood that the flowcharts of FIGS. 4-5 provide merely examples of the many different types of functional arrangements that may be employed to implement the operation of the portion of the packaging suite application 109 as described herein. As an alternative, the flowcharts of FIGS. 4-5 may be viewed as depicting an example of steps of a method implemented in the computing device 106 (FIG. 1) according to one or more embodiments.

FIG. 4 illustrates one example of a way in which the packaging suite application 109 can determine a cost associated with employing a packaging suite to service a given shipment history. First, in box 206, the packaging suite application 109 can retrieve a packaging suite for such a cost is to be calculated. In some embodiments, the packaging suite can comprise one that is currently used in a materials handling facility 103. In other embodiments, the packaging suite application can generate an adjusted packaging suite. Additionally, in some embodiments, the packaging suite application 109 can determine a number of boxes associated with a packaging suite and generate an appropriately sized packaging suite. As noted above, the number of boxes associated with a packaging suite can be a fixed number provided by a user and/or based upon a size of a previously employed packaging suite 116. In box 209, the packaging suite application 109 can retrieve a shipment history associated with a historical time period in the materials handling facility 103. In box 213 the packaging suite application 109 can extract a shipment from the shipment history and, in box 215, the packaging suite application 109 can identify item dimensions of one or more items in the shipment.

In box 217 the packaging suite application 109 can select a box associated with the shipment from the packaging suite generated in box 206. In box 219 the packaging suite application 109 can calculate a cost associated with the selected box as well as any fill material needed to fill any voids and/or empty space in the selected box. In box 221 the packaging suite application 109 can calculate shipping costs associated with shipping the box to its final destination. In box 223 the packaging suite application 109 can determine whether there are additional shipments in the shipment history on which to apply the cost function. In box 225, when the shipment history has been analyzed, a total cost associated with the packaging suite can be calculated.

FIG. 5 illustrates one example of a way in which the packaging suite application 109 can iteratively determine a lowest cost packaging suite that can be employed in a materials handling facility 103 to service a particular shipment history. In one embodiment, the adjusted packaging application can compare two packaging suites, determine which of the packaging suites has the lowest cost, designate the lower cost packaging suite as the current packaging suite, and generate a new candidate that can be compared against the current packaging suite.

Accordingly, in box 301, the packaging suite application 109 can retrieve a current packaging suite that is associated with the lowest known cost as it pertains to servicing a shipment history over a particular historical time period. As noted above, in some alternative embodiments, the packaging suite application 109 can randomly generate a packaging suite and/or generate a packaging suite based at least upon the most commonly shipped item types from a materials handling facility 103. In box 303, the packaging suite application 109 can generate an adjusted packaging suite for which a cost can be calculated and compared against the cost of the current packaging suite. As noted above, the adjusted packaging suite can be generated in various ways. The packaging suite application 109 can modify a random number of dimensions associated with the current packaging suite by a random amount. In another embodiment, the packaging suite application 109 can be configured to modify a minimum number of dimensions associated with the current packaging suite by a minimum adjustment threshold in order to generate the adjusted packaging suite. Additionally, these thresholds can be altered as the iterative process shown in FIG. 5 executes over time. For example, the packaging suite application 109 can be configured to initially modify a certain number of dimensions of the current packaging suite by a larger adjustment threshold. For subsequent iterations of the process shown in FIG. 5, the packaging suite application 109 can modify dimensions of the packaging suite by lesser and lesser amounts. Such a methodology can allow the packaging suite application 109 to arrive at a lowest cost solution faster than if the adjustment threshold is a random number or is unchanged over the course of potentially numerous iterations.

In box 305, the packaging suite application 109 can retrieve a shipment history associated with a particular historical period of time for which a cost is to be calculated for the current packaging suite as well as the adjusted packaging suite. In box 307, the packaging suite application 109 can calculate a cost of each packaging suite by applying a cost function to the current packaging suite and the adjusted packaging suite to calculate a cost of each packaging suite to service the shipment history. In one embodiment, these costs can be calculated by applying the process shown in FIG. 4. In some embodiments, the cost of the current packaging suite can be cached from a previous iteration so that it need not be recalculated. In box 309, the packaging suite application 109 can select the packaging suite associated with the lower cost as determined by the cost function as the current packaging suite.

In box 313, the packaging suite application 109 can determine if a break condition exists, causing termination of the process shown in FIG. 5. If so, then in box 315, the packaging suite application 109 can return the current packaging suite, which represents the lowest cost packaging suite associated with a particular shipment history that the packaging suite application 109 has calculated at the time the break condition was identified in box 313. If not, the packaging suite application 109 can return to box 303, where a new adjusted packaging suite can be generated and its cost compared with the current packaging suite. A break condition can be identified in various ways according to various embodiments of the disclosure. As one example, the process can be interrupted by a user. As another example, a break condition can be identified if the packaging suite application 109 is unable to generate an adjusted packaging suite associated with a lower cost than the current packaging suite after a threshold number of iterations.

Figure 6:
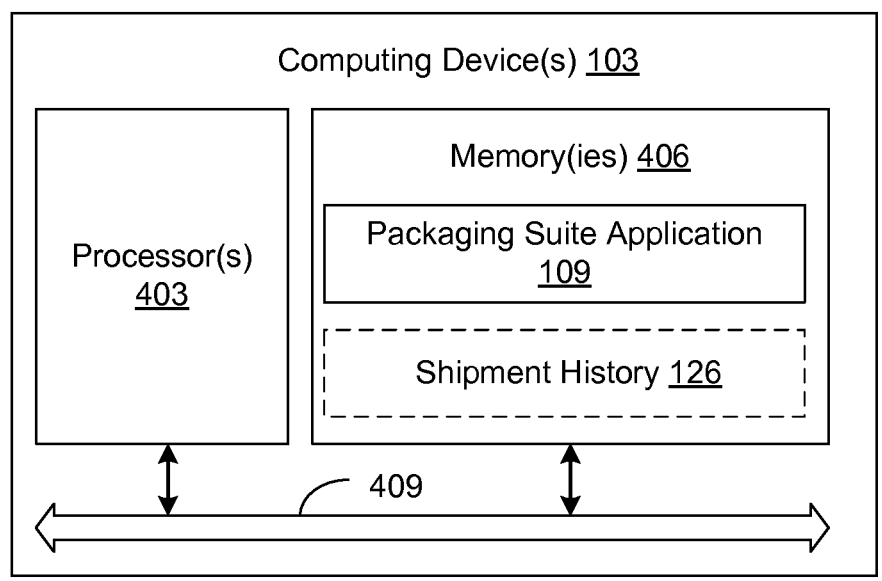
FIG. 6 is a schematic block diagram of one example implementation of a computing device illustrated in FIG. 1 according to an embodiment of the present invention.

With reference to FIG. 6, shown is a schematic block diagram of the computing device 106 according to an embodiment of the present disclosure. The computing device 106 includes at least one processor circuit, for example, having a processor 403 and a memory 406, both of which are coupled to a local interface 409. To this end, the computing device 106 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the packaging suite application 109 and potentially other applications. Also stored in the memory 406 may be the shipment history 126 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the packaging suite application 109 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 4-5 show the functionality and operation of an implementation of portions of the packaging suite application 109. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 4-5 show a specific order of execution, it is understood that the order of execution may differ from that which is depicted. For example, the order of execution of two or more blocks may be scrambled relative to the order shown. Also, two or more blocks shown in succession in the flowcharts may be executed concurrently or with partial concurrence. Further, in some embodiments, one or more of the blocks shown in the flowcharts may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the packaging suite application 109, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable in a computing device, the program comprising:
   code that retrieves a current packaging suite, the current packaging suite comprising a plurality of different packaging dimensions associated with a plurality of respective three-dimensional bounding boxes;
   code that retrieves a shipment history corresponding to a materials handling facility over a historical period of time, the shipment history specifying a plurality of shipments shipped from the materials handling facility during the historical period of time, each of the plurality of shipments corresponding to at least one item;
   code that determines a cost associated with the current packaging suite by applying a cost function to the current packaging suite and the shipment history, the cost based at least upon a shipment cost and a packaging materials cost associated with a selection of three-dimensional bounding boxes from the current packaging suite usable to package and ship the plurality of shipments, the packaging materials cost based at least upon a material cost associated with an amount of material needed to construct the selection of three-dimensional bounding boxes, a fill material cost associated with each of the plurality of shipments, and a shipping cost associated with the selection of three-dimensional bounding boxes, the fill material cost based at least upon a volume of at least one item associated with a respective shipment;
   code that generates a plurality of adjusted packaging suites by modifying at least one of the plurality of packaging dimensions by at least a minimum adjustment threshold;
   code that applies the cost function to the plurality of adjusted packaging suites and the shipment history;
   code that determines whether the plurality of adjusted packaging suites yields a lower cost relative to the current packaging suite; and
   code that, in response to receiving an order, initiates fulfillment of the order by instructing a machine to retrieve at least one item from the order and initiates shipment of the at least one item to a destination in one of the respective plurality of three-dimensional bounding boxes.

2. The non-transitory computer-readable medium of claim 1, further comprising code that designates one of the plurality of adjusted packaging suites as the current packaging suite when the one of the adjusted packaging suites yields the lower cost relative to the current packaging suite.

3. The non-transitory computer-readable medium of claim 2, further comprising:
   code that iteratively generates the plurality of adjusted packaging suites by:
      determining whether a subsequent adjusted packaging suite from the plurality of adjusted packaging suites yields the lower cost relative to the current packaging suite;
      designating the subsequent adjusted packaging suite as the current packaging suite in response to the subsequent adjusted packaging suite yielding the lower cost; and
      generating another subsequent adjusted packaging suite in response to the subsequent adjusted packaging suite not yielding the lower cost.

4. The non-transitory computer-readable medium of claim 3, further comprising code that identifies a break condition when the current packaging suite remains unchanged after a threshold number of iterations.

5. The non-transitory computer-readable medium of claim 3, wherein the code that iteratively generates the at least one subsequent adjusted packaging suite is executed periodically at predefined time intervals.

6. A system, comprising:
   at least one computing device; and
   a packaging suite application executed in the at least one computing device, the packaging suite application comprising:
      logic that retrieves a shipment history corresponding to a materials handling facility over a historical period of time, the shipment history comprising a plurality of shipments shipped from the materials handling facility during the historical period of time;

logic that generates a plurality of packaging dimensions associated with a packaging suite, the plurality of packaging dimensions associated with a respective plurality of three-dimensional bounding boxes in the packaging suite;

logic that determines a cost associated with the packaging suite by applying a cost function to the packaging suite and the shipment history, the cost based at least upon a shipment cost and a packaging materials cost associated with a selection of three-dimensional bounding boxes that are usable to package and ship the plurality of shipments during the historical period of time, the packaging materials cost comprising a material cost of an amount of material needed to construct the respective plurality of three-dimensional bounding boxes based at least upon dimensions of individual ones of the respective plurality of three-dimensional bounding boxes; and logic that, in response to receiving an order, initiates fulfillment of the order by instructing a machine to retrieve at least one item from the order and initiates shipment of the at least one item to a destination in one of the respective plurality of three-dimensional bounding boxes.

7. The system of claim 6, wherein individual ones of the plurality of packaging dimensions further comprise an x dimension, a y dimension, and a z dimension.

8. The system of claim 6, wherein the packaging materials cost is further based at least upon an amount of fill material calculated to occupy a volume of a respective one of the plurality of three-dimensional bounding boxes unoccupied by at least one item associated with individual ones of the plurality of shipments.

9. The system of claim 6, wherein the shipment cost is based at least upon a rate charged by a carrier to ship a respective shipment to a respective destination.

10. The system of claim 9, wherein the shipment cost is based at least upon a higher of a weight-based shipment rate or a volume-based shipment rate.

11. A method comprising:

retrieving, in at least one computing device, a plurality of packaging dimensions associated with a plurality of three-dimensional bounding boxes of a packaging suite, individual ones of the plurality of packaging dimensions associated with a respective one of the plurality of three-dimensional bounding boxes in the packaging suite;

retrieving, in the at least one computing device, a shipment history corresponding to a materials handling facility over a historical period of time, the shipment history comprising an identity of items associated with a plurality of shipments that have been shipped from the materials handling facility during the historical period of time;

determining, in the at least one computing device, a cost associated with the packaging suite by applying a cost function to the packaging suite and the shipment history, the cost based at least upon a shipment cost and a packaging materials cost associated with a selection of packages employed to package and ship the plurality of shipments during the historical period of time, the packaging materials cost comprising a material cost of an amount of material needed to construct the respective plurality of three-dimensional bounding boxes based at least upon packaging dimensions of individual ones of the plurality of three-dimensional bounding boxes;

generating, in the at least one computing device, an adjusted packaging suite by modifying at least one of the plurality of packaging dimensions by a minimum adjustment threshold, the adjusted packaging suite comprising a plurality of adjusted packaging dimensions;

applying, in the at least one computing device, the cost function to the adjusted packaging suite and the shipment history;

determining, in the at least one computing device, whether the adjusted packaging suite yields a lower cost relative to the packaging suite; and in response to receiving an order, initiating, in the at least one computing device, fulfillment of the order by instructing a machine to retrieve at least one item from the order and initiates shipment of the at least one item to a destination in one of the respective plurality of three-dimensional bounding boxes.

12. The method of claim 11, further comprising:

generating a plurality of adjusted packaging suites and calculating a plurality of adjusted costs associated with the plurality of adjusted packaging suites; and identifying a respective one of the plurality of adjusted packaging suites with a lowest cost associated with packaging and shipment of the plurality of shipments in the shipment history.

13. The method of claim 11, further comprising:

designating, in the at least one computing device, the adjusted packaging suite as a current packaging suite when the adjusted packaging suite yields a lower cost relative to the packaging suite;

generating, in the at least one computing device, a second adjusted packaging suite by modifying at least one of the plurality of packaging dimensions of the second adjusted packaging suite by a second minimum adjustment threshold;

applying, in the at least one computing device, the cost function to the second adjusted packaging suite and the shipment history; and determining, in the at least one computing device, whether the second adjusted packaging suite yields a lower cost relative to the current packaging suite.

14. The method of claim 13, wherein the second minimum adjustment threshold is less than the minimum adjustment threshold.

15. The method of claim 11, wherein retrieving the plurality of packaging dimensions associated with the packaging suite further comprises:

identifying, in the at least one computing device, a subset of item types in the shipment history that are most often shipped from the materials handling facility;

identifying, in the at least one computing device, item dimensions of individual ones of the subset of item types; and designating, in the at least one computing device, the plurality of packaging dimensions to form a plurality of packages large enough to package the individual ones of the subset of item types.

16. The method of claim 11, wherein the packaging materials cost is based at least upon an amount of fill material calculated to occupy a volume of the package unoccupied by at least one item associated with each of the plurality of shipments.

17. The method of claim 11, wherein the shipment cost is based at least upon a rate charged by a carrier to ship the respective one of the plurality of shipments to a respective destination.

18. The method of claim 11, wherein retrieving the plurality of packaging dimensions associated with the packaging suite further comprises generating, in the at least one computing device, a set of random dimensions corresponding to a number of dimensions of each respective package in the packaging suite.

19. The method of claim 11, wherein generating the adjusted packaging suite further comprises adjusting, in the at least one computing device, a random number of the plurality of packaging dimensions by a random amount.

20. The method of claim 11, further comprising:
receiving as an input, in the at least one computing device, a total number of packaging sizes in the packaging suite; and
designating a number of packaging sizes in the adjusted packaging suite as the total number of packaging sizes.

* * * * *